Feb. 15, 1927.
A. H. KATTERJOHN
1,617,914
ROCK DRILL
Filed Feb. 28, 1923
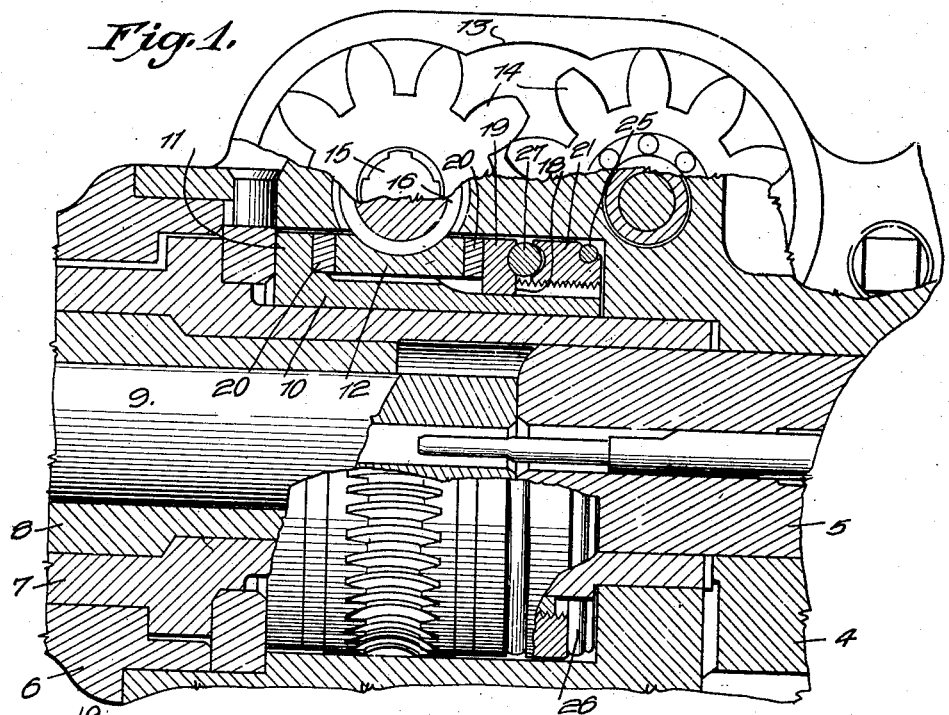
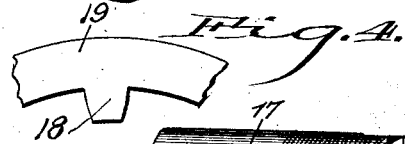
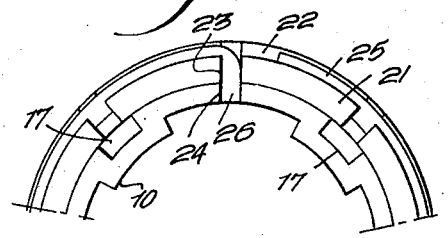
Inventor
August H. Katterjohn
By
Attorney Patented Feb. 15, 1927.

1,617,914

UNITED STATES PATENT OFFICE.

AUGUST H. KATTERJOHN, OF DENVER, COLORADO, ASSIGNOR TO THE DENVER ROCK DRILL MANUFACTURING COMPANY, OF DENVER, COLORADO, A CORPORATION OF DELAWARE.

ROCK DRILL.

Application filed February 28, 1923. Serial No. 621,859.

The present invention relates more particularly to means for frictionally holding the driving member of a rock drill chuck against relative rotation with respect to the chuck, so that the chuck will be rotated thereby, and yet when there is undue resistance to the rotation of said chuck by the sticking of the drill steel or the like, the driving member will rotate around the chuck and thus prevent breakage or undue strain upon the parts.

In the accompanying drawings,

Figure 1 is a longitudinal sectional view through a portion of the chuck end of a rock drill, Figure 2 is a detail perspective view of the means for varying the friction between the driving gear and the chuck, Figure 3 is a detail rear elevation of the parts shown in Figure 2 in their assembled relation.

Figure 4 is a detail view of a portion of the abutment washer showing one of its lugs.

In the disclosure, a portion of the barrel of a rock drill is illustrated at 4, and contains the usual hammer piston 5. A portion of the front head is shown at 6, and mounted therein is a chuck, which includes a sleeve 7 having a bushing 8 that receives the drill steel, a portion of such drill steel being shown at 9. On this sleeve is fixed a collar 10 having a front abutment flange 11. Rotatably mounted on this collar 10 is the driving member in the form of a worm wheel or gear 12. This worm wheel is driven from a rotary motor 13, which includes intermeshing gear pistons 14, one of which carries a worm shaft 15. On the shaft is a worm 16 in mesh with the driving gear 12 in a manner well understood by those skilled in the art.

The rear end of the collar 10 is provided with longitudinal key-ways 17 that receive the inwardly extending lugs 18 of a washer 19 that is slidably mounted on the rear end of said collar. One of these lugs is shown in section in Figure 4. The gear wheel 12 is thus located between the abutment flange 11 and said washer 19, and interposed between the opposite sides of the gear wheel 12 and said flange and washer are friction washers 20. A nut 21 is threaded on the rear end of the collar, and is provided with an annular groove 22 and a plurality of transverse slots 23 that intersect said groove. The rear end of the collar 10 is also provided with a plurality of transverse slots 24, with which the slots 23 are adapted to register when the nut 21 is rotated. A locking member is provided that is in the form of a spring ring 25 that snugly fits in the groove 22 and is rotatable therein. Said spring has one end 26 inturned and adapted to engage any of the slots 23 of the nut and the different slots 24 of the chuck collar 10. Interposed between the nut and the washer 19 is a spring washer 27 that is laterally yieldable, being preferably zigzag or reversely curved.

With this construction, it will be evident that by turning the nut 21, more or less friction can be secured between the driving gear 12 and the chuck collar 10, so that the amount of resistance to be overcome by the driving motor can be varied as desired. A very fine adjustment can be obtained by reason of the structure of the nut 21 and the locking key, for because of the large number of slots 23 and 24 a pair of these slots can be brought into register upon a relatively small movement of the nut and the key element 26 engaged therein so as to hold the nut when desirably positioned.

From the foregoing, it is thought that the construction, operation and many advantages of the herein described invention will be apparent to those skilled in the art, without further description, and it will be understood that various changes in the size, shape, proportion and minor details of construction, may be resorted to without departing from the spirit or sacrificing any of the advantages of the invention.

Having thus fully described my invention, what I claim as new, and desire to secure by Letters Patent, is:—

1. In a rock drill, the combination with a rotatable steel receiving chuck, of means for rotating the same, including a driven member rotatably mounted on the chuck, means including a motor for driving the driven member, means surrounding the chuck for creating a friction clutch engagement between said member and chuck, and means for varying said engagement, including a nut threaded on the chuck and acting against the member, and means for locking the nut against movement to the chuck and in a plurality of different positions.

2. In a rock drill, the combination with a rotatable steel receiving chuck, of means for rotating the same, including a driven member rotatable on the chuck, means including a motor for driving said member, means surrounding the chuck for creating a friction clutch engagement between said member and chuck, and means for varying said engagement, including a nut threaded on the chuck and acting against the member, and means for locking the nut against movement to the chuck at a plurality of different points of each complete rotation of the nut.

3. In a rock drill, the combination with a rotatable steel receiving chuck, of means for rotating the same, including a driven member rotatable on the chuck, means including a motor for rotating the driven member, means surrounding the chuck for creating a friction clutch engagement between said member and chuck, and means for varying said engagement including a nut threaded on the chuck and acting against the member, and a locking key adjustably mounted on the nut and adapted to interlock with different portions of the chuck to hold the nut in different positions on the chuck.

4. In a rock drill, the combination with a rotatable steel receiving chuck, of means for rotating the same, including a driven member rotatable on the chuck, means for driving said member, means for creating a friction clutch engagement between said member and chuck, and means for varying said engagement, including a nut threaded on the chuck and acting against the member and a locking key comprising a ring rotatably mounted on the nut and having portions that interlock therewith and with the chuck out of line with the steel placed in the chuck, to hold the nut in different positions on the chuck.

5. In a rock drill, the combination with a rotatable chuck having a drill receiving socket, of means for rotating the same, including a driven member rotatable on the chuck, driving means for said member, means for creating a friction clutch engagement between said member and clutch, and means for varying said engagement, including a nut threaded on the chuck and having an external annular groove and a plurality of slots intersecting said groove, the chuck also having a plurality of slots, and a spring ring rotatably mounted in the groove and having an inturned end that is adapted to engage in the slots of the nut and the chuck and terminates short of the drill receiving socket.

6. In a rock drill, the combination with a rotatable chuck sleeve having a steel receiving bore, of a collar thereon having a driving gear rotatably mounted on the collar, means for holding the gear and collar frictionally against relative rotation, including a nut threaded on the rear end of the collar and having a groove and slots intersecting the groove, said collar also having slots, and a spring ring rotatable on the collar and having an inturned end constituting a key that is adapted to engage in the slots of the nut and collar.

7. In a rock drill, the combination with a rotatable chuck sleeve having means for receiving a drill steel, of a gear wheel surrounding and rotatable about the sleeve, a motor geared to the gear wheel for rotating it, means movably mounted on the chuck sleeve for creating a variable amount of clutching friction on the gear wheel to cause it to normally rotate the chuck sleeve, and means for fixing the friction creating means in different positions with respect to the sleeve to maintain a predetermined friction.

8. In a rock drill, the combination with a rotatable chuck sleeve having means for receiving a drill steel, of a gear wheel surrounding and rotatable about the sleeve, a motor geared to the gear wheel for rotating it, means including a nut threaded on the sleeve for creating a variable amount of clutching friction on the gear wheel to cause it to normally rotate the chuck sleeve, and means for fixing the nut against rotation with respect to the sleeve and in different positions thereon to maintain a predetermined friction.

9. In a rock drill, the combination with a chuck sleeve having means for receiving a drill steel to be operated on, a collar surrounding and fixed to the sleeve and having an abutment flange, a washer surrounding and slidably keyed to the sleeve, a worm wheel surrounding and rotatable on the collar between the abutment and the collar, a motor geared to the worm wheel for rotating it, means for causing the flange and washer to have a frictional clutching action on the worm wheel, whereby the latter will normally rotate the collar, sleeve and drill steel in the latter, and means for varying such friction gripping action and for locking the latter to maintain the same at a substantially predetermined degree.

In testimony whereof, I affix my signature.

AUGUST H. KATTERJOHN.